(12) United States Patent
Saji et al.

(10) Patent No.: US 12,501,153 B2
(45) Date of Patent: Dec. 16, 2025

(54) CONTROL APPARATUS, IMAGE PICKUP APPARATUS, LENS APPARATUS, CONTROL METHOD, AND STORAGE MEDIUM

(71) Applicant: CANON KABUSHIKI KAISHA, Tokyo (JP)

(72) Inventors: Yoshiki Saji, Kanagawa (JP); Yuichiro Kato, Tochigi (JP); Masayasu Mizushima, Tochigi (JP); Akino Moriyoshi, Tochigi (JP); Toshimune Nagano, Saitama (JP); Toru Matsumoto, Tochigi (JP); Takami Hirasawa, Tochigi (JP); Hiroki Osaka, Tochigi (JP); Takeo Mori, Tokyo (JP); Yuki Matsuba, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 83 days.

(21) Appl. No.: 18/645,612

(22) Filed: Apr. 25, 2024

(65) Prior Publication Data

US 2024/0388795 A1 Nov. 21, 2024

(30) Foreign Application Priority Data

May 17, 2023 (JP) .................................. 2023-081717

(51) Int. Cl.
*H04N 23/667* (2023.01)
*H04N 23/67* (2023.01)
*H04N 23/695* (2023.01)

(52) U.S. Cl.
CPC ......... *H04N 23/667* (2023.01); *H04N 23/672* (2023.01); *H04N 23/695* (2023.01)

(58) Field of Classification Search
CPC ... H04N 23/695; H04N 23/667; H04N 23/672
USPC .................................................. 348/207.99
See application file for complete search history.

(56) References Cited

U.S. PATENT DOCUMENTS

| | | | | |
|---|---|---|---|---|
| 9,936,122 | B2* | 4/2018 | Hamano | H04N 25/704 |
| 10,812,728 | B2* | 10/2020 | Niga | H04N 23/631 |
| 11,037,277 | B2* | 6/2021 | Ito | H04N 25/611 |
| 11,212,452 | B2 | 12/2021 | Kimura | |
| 11,310,431 | B2* | 4/2022 | Sugaya | H04N 23/75 |
| 12,047,681 | B2* | 7/2024 | Kawasaki | G03B 13/36 |

(Continued)

FOREIGN PATENT DOCUMENTS

| | | |
|---|---|---|
| JP | 2003244526 A | 8/2003 |
| JP | 2010191078 A | 9/2010 |

(Continued)

*Primary Examiner* — Pritham D Prabhakher
(74) *Attorney, Agent, or Firm* — ROSSI, KIMMS & McDOWELL LLP

(57) ABSTRACT

A control apparatus includes a memory storing instructions, and a processor configured to execute the instructions to acquire first information on a position of a first optical member configured to obtain a tilt effect of tilting a focal plane relative to an imaging surface of an image sensor, and second information on an aperture diameter in a diaphragm unit configured to adjust a light amount, and control a second optical member configured to change an incident ray angle on the image sensor, by changing a control mode of the second optical member according to the first information and the second information.

19 Claims, 12 Drawing Sheets

(56) References Cited

U.S. PATENT DOCUMENTS

| | | | | |
|---|---|---|---|---|
| 2016/0072995 | A1* | 3/2016 | Kojima | G03B 7/17 |
| | | | | 348/371 |
| 2017/0280045 | A1* | 9/2017 | Nonaka | H04N 23/695 |
| 2019/0349532 | A1* | 11/2019 | Niga | H04N 23/62 |
| 2019/0384033 | A1* | 12/2019 | Shirai | G06T 5/80 |
| 2020/0304721 | A1* | 9/2020 | Sugaya | H04N 23/695 |
| 2021/0092302 | A1* | 3/2021 | Kawasaki | H04N 23/675 |
| 2021/0144307 | A1* | 5/2021 | Kimura | H04N 23/69 |
| 2022/0086356 | A1* | 3/2022 | Kawasaki | H04N 23/675 |
| 2022/0303474 | A1* | 9/2022 | Kimura | H04N 23/611 |
| 2022/0345633 | A1* | 10/2022 | Kawasaki | G03B 13/36 |

FOREIGN PATENT DOCUMENTS

| | | | |
|---|---|---|---|
| JP | 2019090952 A | 6/2019 | |
| JP | 2021076777 A | 5/2021 | |

* cited by examiner

CONTROL APPARATUS, IMAGE PICKUP APPARATUS, LENS APPARATUS, CONTROL METHOD, AND STORAGE MEDIUM

BACKGROUND

Technical Field

One of the aspects of the embodiments relates to a control apparatus, an image pickup apparatus, a lens apparatus, a control method, and a storage medium.

Description of Related Art

Japanese Patent Laid-Open No. 2010-191078 discloses an optical system that has a tilt effect that tilts a focal plane so as to focus on an object plane that is tilted relative to a plane orthogonal to the optical axis of the optical system, by tilting the optical axis relative to an imaging surface. Japanese Patent Laid-Open No. 2019-90952 discloses an optical system that includes a tilt lens configured to generate the tilt effect by decentering it in a direction orthogonal to the optical axis of the optical system, and a correction lens configured to correct a composition shift caused by the movement of the tilt lens.

However, in the optical system disclosed in Japanese Patent Laid-Open No. 2019-90952, in a case where an aperture value (F-number) is large, a light amount of at least one of a pair of focus detectors decreases, and intensity unevenness of an image signal increases, so that accurate focus detection cannot be performed. In other words, depending on an eccentricity amount of the tilt lens and the F-number during tilt imaging, the accuracy of the focus detection may lower.

SUMMARY

A control apparatus according to one aspect of the disclosure includes a memory storing instructions, and a processor configured to execute the instructions to acquire first information on a position of a first optical member configured to obtain a tilt effect of tilting a focal plane relative to an imaging surface of an image sensor, and second information on an aperture diameter in a diaphragm unit configured to adjust a light amount, and control a second optical member configured to change an incident ray angle on the image sensor, by changing a control mode of the second optical member according to the first information and the second information. An image pickup apparatus and a lens apparatus each having the above control apparatus also constitute another aspect of the disclosure. A control method corresponding to the above control apparatus and a storage medium storing a program that causes a computer to execute the above control method also constitute another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of this embodiment according to the disclosure.

Figure 1:
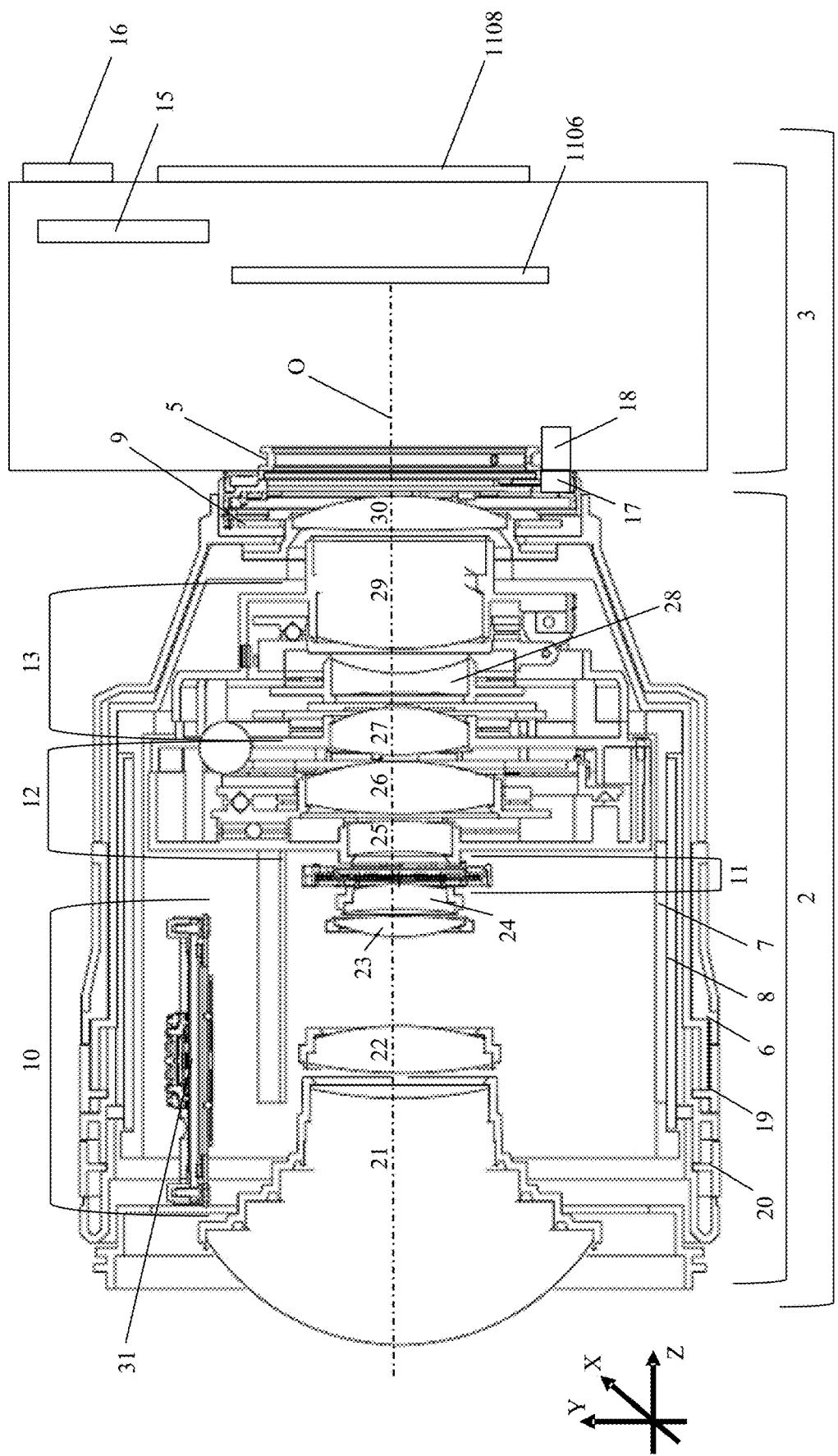
FIG. 1 is a sectional view of a camera system according to this embodiment.
Figure 2:
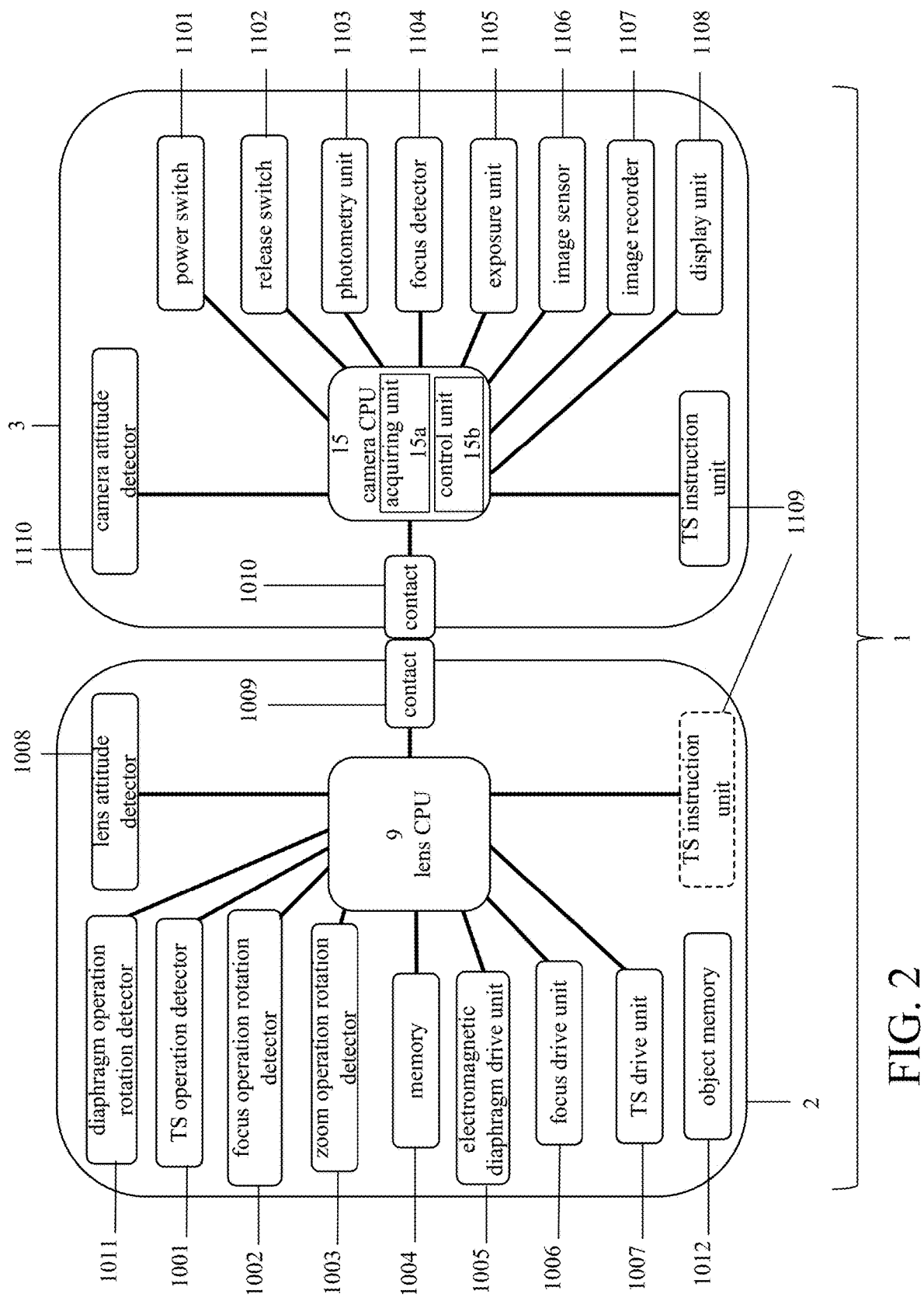
FIG. 2 is a block diagram of the camera system according to this embodiment.

Referring now to FIGS. 1 and 2, a description will be given of a camera system (image pickup system) 1 according to this embodiment. FIG. 1 is a sectional view of the camera system 1. FIG. 2 is a block diagram of the camera system 1.

Camera System

As illustrated in FIGS. 1 and 2, the camera system 1 includes a lens apparatus 2 and a camera body (image pickup apparatus) 3. The lens apparatus 2 and the camera body 3 are connected via a mount 5 provided on the lens apparatus 2 and a mount (not illustrated) provided on the camera body 3, and can communicate with each other via a lens communication unit 17 provided in the lens apparatus 2 and a camera communication unit 18 provided in the camera body 3. The lens communication unit 17 and the camera communication unit 18 each include contacts 1009 and 1010 for supplying power from the camera body 3 to the lens apparatus 2. In this embodiment, a vertical direction (gravity direction) in FIG. 1 is defined as a Y-axis direction, a direction parallel to an optical axis O of an optical system included in the lens apparatus 2 is defined as a Z-axis direction, and a direction orthogonal to the Y-axis direction and the Z-axis direction is defined as an X-axis direction.

The camera body 3 includes an image sensor 1106, a display unit 1108, a camera CPU 15, and a (view) finder 16. By controlling an unillustrated shutter by the camera CPU 15, a light beam which has passed through the lens apparatus 2 is imaged on the image sensor 1106. The image sensor 1106 has a plurality of pixels arranged on a plane perpendicular to the optical axis O, and a captured object image is photoelectrically converted by a photodiode in the pixel. In this embodiment, the pixels arranged on the image sensor 1106 also serve as focus detecting pixels, and the camera CPU 15 detects a focus state of an object based on an output of the focus detecting pixels. The display unit 1108 displays a captured image and a setting screen for changing various settings of the camera system 1. By peeping through the finder 16, a user can check the captured image and input a line of sight (visual line).

In this embodiment, although the lens apparatus 2 is attachable to and detachable from the camera body 3, this embodiment is also applicable to a camera system in which a lens apparatus and a camera body are integrated.

Lens Apparatus

The lens apparatus 2 includes an optical system (imaging optical system), a zoom operation ring 6, a guide barrel 7, a cam barrel 8, a lens CPU 9, and a diaphragm mechanism (aperture stop, diaphragm unit) 11. The optical system includes a first lens unit 21, a second lens unit 22, a third lens unit 23, a fourth lens unit 24, a fifth lens unit 25, a sixth lens unit 26, a seventh lens unit 27, an eighth lens unit 28, a ninth lens unit 29, and a tenth lens unit 30.

Each lens unit is held by a lens barrel having a cam follower. The cam follower is engaged with a linear groove parallel to the optical axis O provided on the guide barrel 7 and a groove tilted relative to the optical axis O provided on the cam barrel 8. When the zoom operation ring 6 rotates, the cam barrel 8 rotates, and the arrangement of each lens in the Z-axis direction changes. Thereby, a focal length of the lens apparatus 2 changes. The focal length of the lens apparatus 2 can be detected by an unillustrated zoom position detector configured to detect a rotation amount of the zoom operation ring 6. The lens CPU 9 changes an aperture diameter (F-number) of the optical system by controlling the diaphragm mechanism 11 configured to adjust a light amount.

The second lens unit 22 is a focus unit (focus group) that performs focusing by moving in the Z-axis direction. The lens CPU 9 controls the second lens unit 22 via a vibration actuator 31 using a detection signal from a detector configured to detect a moving amount of the second lens unit 22.

The lens apparatus 2 includes a tilt member for obtaining a tilt effect that tilts a focal plane relative to an imaging surface of the image sensor 1106, and a shift member which provides a shift effect of shifting an imaging range (composition, field of view) by changing an incident ray angle on the image sensor. Here, the incident ray angle is an angle between a ray incident on the imaging surface of the image sensor 1106 and a normal line of the imaging surface. In this embodiment, the tilt member and the shift member are respectively the sixth lens unit (tilt lens, first optical member) 26 and the eighth lens unit (correction lens, second optical member) 28 which are movable in a direction orthogonal to the optical axis O. In this embodiment, by moving the sixth lens unit 26 and the eighth lens unit 28 in the direction orthogonal to the optical axis O, the tilt effect and the shift effect can be obtained, respectively.

The lens CPU 9 controls the sixth lens unit 26 via a drive unit using a signal from an unillustrated detector configured to detect a moving amount of the sixth lens unit 26. The lens CPU 9 controls the eighth lens unit 28 via a drive unit using a signal from an unillustrated detector configured to detect a moving amount of the eighth lens unit 28. The drive unit which moves the sixth lens unit 26 and the eighth lens unit 28 is, for example, a stepping motor or a voice coil motor (VCM). The tilt effect is also available by tilting (rotating) a lens.

Camera Control Flow

As illustrated in FIG. 2, the camera CPU (control apparatus) 15 includes a microcomputer, and controls the operation of each unit in the camera body 3. In a case where the lens apparatus 2 is attached to the camera body 3, the camera CPU 15 communicates with the lens CPU 9 via the lens communication unit 17 and the camera communication unit 18. Information (signal) which the camera CPU 15 transmits to the lens CPU 9 includes moving amount information about the second lens unit 22 and defocus information. The information which the camera CPU 15 transmits to the lens CPU 9 further includes attitude information on the camera body 3 based on a signal from a camera attitude detector 1110 such as an acceleration sensor. The information which the camera CPU 15 transmits to the lens CPU 9 further includes information such as object distance information based on a signal from a tilt/shift (TS) instruction unit 1109 configured to specify an object the user intends to focus on, and imaging range information which indicates a desired imaging range (field of view). Information (signal) which the lens CPU 9 transmits to the camera CPU 15 includes, for example, optical information such as an imaging magnification of a lens, and lens function information such as the diaphragm mechanism 11 and zoom mounted on the lens apparatus 2. The information which the lens CPU 9 transmits to the camera CPU 15 may further include attitude information on the lens apparatus 2 based on a signal from a lens attitude detector 1008 such as a gyro sensor or an acceleration sensor.

A power switch 1101 is a switch that is operable by the user and used to start the camera CPU 15 and start supplying power to each actuator, sensor, etc. in the camera system 1. A release switch 1102 is a switch that is operable by the user, and includes a first stroke switch SW1 and a second stroke switch SW2. A signal from the release switch 1102 is input to the camera CPU 15. The camera CPU 15 enters an imaging preparation state in response to an input of an turning-on signal from the first stroke switch SW1. In the imaging preparation state, a photometry unit 1103 measures the object luminance, and a focus detector 1104 performs focus detection.

The camera CPU 15 calculates an aperture value of the diaphragm mechanism 11, an exposure amount (shutter time) of the image sensor 1106, etc. based on a photometry result by the photometry unit 1103. The camera CPU 15 determines the moving amount (including drive direction) of the second lens unit 22 based on focus information (defocus amount and defocus direction) on the optical system detected by the focus detector 1104. Information on the moving amount of the second lens unit 22 is transmitted to the lens CPU 9.

In this embodiment, as described above, by moving the sixth lens unit 26 and the eighth lens unit 28 in the direction orthogonal to the optical axis O, the tilt effect and the shift effect can be obtained. The camera CPU 15 calculates a tilt drive amount for focusing on the desired object indicated through the TS instruction unit 1109. In this embodiment, the TS instruction unit 1109 is included in the display unit 1108 having a touch panel function. The camera CPU 15 calculates a shift drive amount for changing a current imaging range to an imaging range indicated through the TS instruction unit 1109. The camera CPU 15 transmits acquired information on the drive amount to the lens CPU 9. The sixth lens unit 26 and the eighth lens unit 28 are controlled based on the information on the drive amount described above.

As will be described below, in a case where the focus detector 1104 cannot accurately detect the focus information on the optical system, the sixth lens unit 26 and the eighth lens unit 28 are controlled using a mode different from the above control mode. In this embodiment, the camera CPU 15 includes an acquiring unit 15*a* and a control unit 15*b*. The acquiring unit 15*a* acquires first information on a position of the sixth lens unit 26 (control position, eccentricity amount in the direction orthogonal to the optical axis) for obtaining the tilt effect, and second information on the aperture diameter of the diaphragm mechanism 11. The control unit 15*b* controls the eighth lens unit 28 in order to change the incident ray angle on the image sensor 1106. The control unit 15*b* also changes the control mode for the eighth lens unit 28 according to the first information and the second information.

For example, the control unit 15*b* determines whether or not the focus detection using a phase difference method can be performed based on the first information and the second information. In a case where the control unit 15*b* determines that the focus detection using the phase difference method cannot be performed, the control unit 15*b* changes the incident ray angle so that the focus detection using the phase difference method can be performed. The control unit 15*b* may set the control mode to a first control mode (first mode) in a case where the control unit 15*b* determines that the focus detection using the phase difference method can be performed. On the other hand, in a case where the control unit 15*b* determines that the focus detection using the phase difference method cannot be performed, the control unit 15*b* sets the control mode to a second control mode (second mode). In the first mode, the control unit 15*b* controls the eighth lens unit 28 so as to maintain the field of view in accordance with a tilt amount depending on a position of the sixth lens unit 26. In the second mode, the control unit 15*b* controls the eighth lens unit 28 so that the incident ray angle becomes an angle at which it is determined that the focus detection using the phase difference method can be performed. Alternatively, the control unit 15*b* may determine whether or not a determination value according to the first information and the second information is larger than a predetermined threshold. Then, the control unit 15*b* sets the control mode to the first mode in a case where the determination value is smaller than the predetermined threshold, and sets the control mode to the second mode in a case where the determination value is larger than the predetermined threshold.

The number of objects specified by the TS instruction unit 1109 may be plural. Even if objects having different distances are specified, these objects can be focused as long as they are located on an object plane tilted due to the tilt effect. The TS instruction unit 1109 may be provided in the lens apparatus 2 instead of the camera body 3. The function of the TS instruction unit 1109 may be assigned to an operation unit already provided in the camera system 1.

The camera CPU 15 transmits an exposure start command to an exposure unit 1105, and causes an unillustrated mirror to retreat or an unillustrated shutter to open. In a case where the camera body 3 is a mirrorless camera, the retreat operation is not performed. The camera CPU 15 causes the image sensor 1106 to perform a photoelectric conversion of an object image, that is, an exposure operation.

An imaging signal from the image sensor 1106 is digitally converted by a signal processing unit in the camera CPU 15, further subjected to various correction processes, and output as an image signal. The image signal (data) is stored in an image recorder 1107 such as a semiconductor memory such as a flash memory, a magnetic disk, and an optical disc. The display unit 1108 can display an image captured by the image sensor 1106 during imaging. The display unit 1108 can display images recorded in the image recorder 1107.

Lens Control Flow

A description will now be given of a control flow inside the lens apparatus 2. A focus operation rotation detector 1002 detects a rotation of a focus operation ring 19. A diaphragm operation rotation detector 1011 detects a rotation of a diaphragm operation ring 20. A zoom operation rotation detector 1003 detects a rotation of the zoom operation ring 6. An object memory 1012 stores a spatial position in the imaging range of the object indicated through the TS instruction unit 1109 (position information in space based on the image sensor 1106). Here, the spatial position is an object distance or coordinate information in a spatial coordinate system based on the image sensor 1106.

A TS operation detector 1001 includes a manual operation unit for obtaining the tilt effect and the shift effect, and a sensor configured to detect an operation amount of the manual operation unit. A focus drive unit 1006 includes the second lens unit 22 and a vibration actuator 31 configured to move the second lens unit 22 in the Z-axis direction in accordance with moving amount information. The moving amount information may be determined based on a signal from the camera CPU 15, or may be determined based on a signal output by operating the focus operation ring 19.

An electromagnetic diaphragm drive unit 1005 changes the diaphragm mechanism 11 to an aperture state corresponding to an instructed aperture value in response to an instruction from the lens CPU 9 which has received a diaphragm drive command from the camera CPU 15 or in response to a user's instruction via the diaphragm operation ring 20. A TS drive unit 1007 moves the sixth lens unit 26 and the eighth lens unit 28 in response to an instruction from the lens CPU 9 based on information on a drive amount transmitted from the camera CPU 15. The lens CPU 9 controls the TS drive unit 1007 and the focus drive unit 1006 so that the TS drive unit 1007 and the focus drive unit 1006 can operate optimally, in order to obtain a desired focus. The lens apparatus 2 has an optical characteristic that the focus changes even if the object distance does not change by a shift operation of the sixth lens unit 26 and the eighth lens unit 28, and the TS drive unit 1007 and the focus drive unit 1006 are controlled to operate optimally in accordance with this optical characteristic.

Image Sensor

Figure 3:
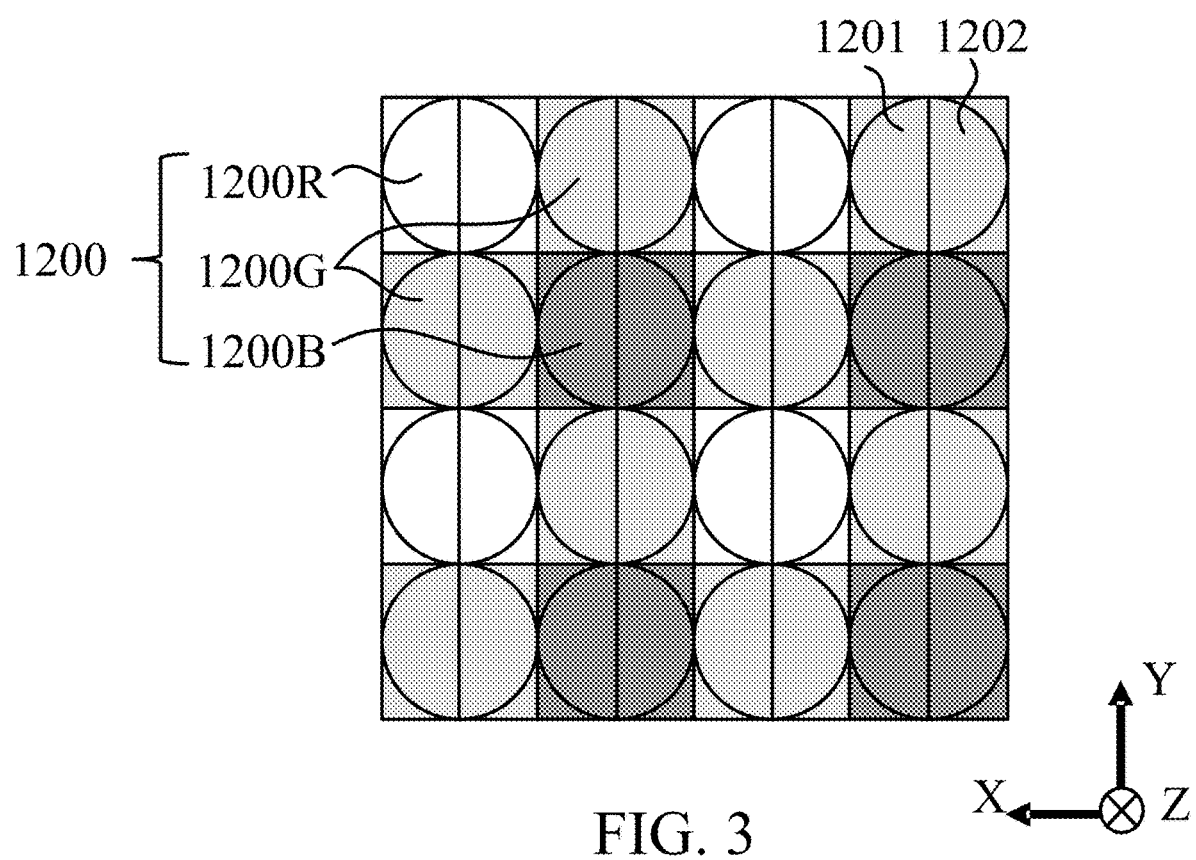
FIG. 3 is a pixel array diagram of an image sensor according to this embodiment.
Figure 4A:
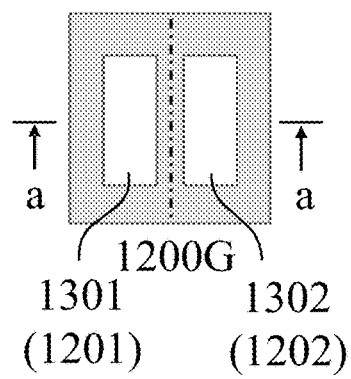
FIGS. 4A and 4B are a plan view and a sectional view of a pixel according to this embodiment, respectively.
Figure 4B:
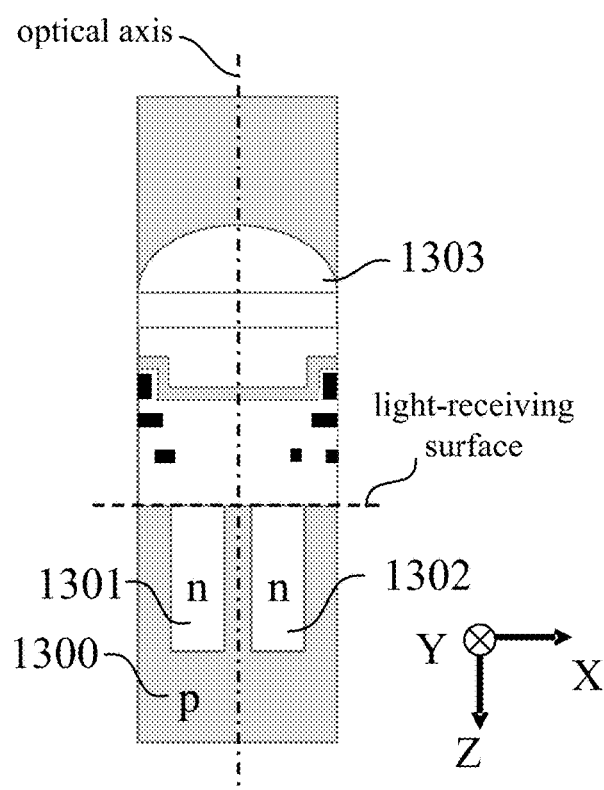

Referring now to FIGS. 3 to 4B, a description will be given of the focus detection performed by the camera body 3 according to this embodiment. FIG. 3 is a pixel array diagram which illustrates a pixel array of the image sensor 1106 of the camera body 3 in a range of 4 columns and 4 rows, and an array of focus detecting pixels in a range of 8 columns and 4 rows. In a pixel unit 1200 of 2 columns and 2 rows illustrated in FIG. 3, a pixel 1200R having a spectral sensitivity of R (red) is located at an upper left position, pixels 1200G having a spectral sensitivity of G (green) are located at an upper right position and a lower left position, and a pixel 1200B having a spectral sensitivity of B (blue) is located at a lower right position. Each pixel includes a first focus detecting pixel 1201 and a second focus detecting pixel 1202 arranged in two columns and one row. A plurality of 4 columns and 4 rows of pixels (8 columns and 4 rows of focus detecting pixels) illustrated in FIG. 3 are arranged on the imaging surface to enable an acquisition of a captured image (focus detecting signal).

FIG. 4A is a plan view of one of the pixels 1200G of the image sensor 1106 illustrated in FIG. 3, viewed from a light-receiving surface side (−z side) of the image sensor 1106. FIG. 4B is a sectional view of a-a section in FIG. 4A viewed from the −y side. The "optical axis" illustrated in FIG. 4B indicates an optical axis of a microlens 1303. As illustrated in FIGS. 4A and 4B, in the pixel 1200G, the microlens 1303 is formed to condense an incident light on the light-receiving side of each pixel, and a photoelectric conversion unit 1301 and a photoelectric conversion unit 1302 are formed which are divided into two in the x direction. The photoelectric conversion units 1301 and 1302 correspond to the first focus detecting pixel 1201 and the second focus detecting pixel 1202, respectively. In the photoelectric conversion units 1301 and 1302, a pair of an electron and a hole are generated depending on a light-receiving amount, and after being separated by a depletion layer, the negatively charged electron is accumulated in an n-type layer, while the hole is discharged to the outside of the image sensor 1106 through a p-type layer connected to a constant voltage source (not illustrated). The electrons accumulated in the n-type layers of the photoelectric conversion units 1301 and 1302 are transferred to a capacitance section (FD) via a transfer gate and converted into a voltage signal.

Focus Detection

Figure 5:
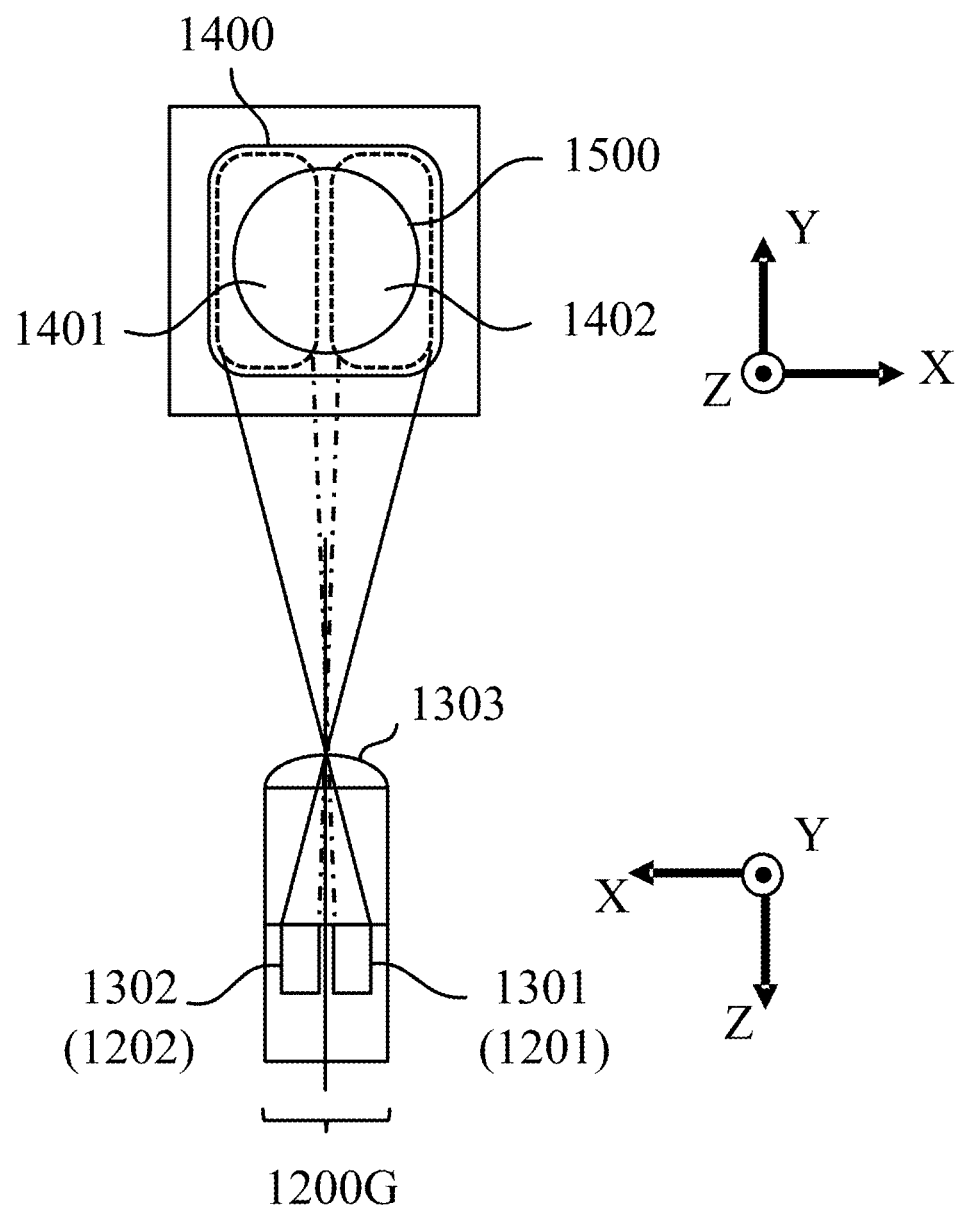
FIG. 5 illustrates a relationship between a pixel and pupil division according to this embodiment.

FIG. 5 is a schematic explanatory diagram illustrating a relationship between a pixel structure and a pupil division illustrated in FIGS. 4A and 4B. FIG. 5 illustrates a sectional view of the a-a section of the pixel structure illustrated in FIG. 4 viewed from the +y side and an exit pupil plane of the lens apparatus 2. In FIG. 5, the x-axis and y-axis of the sectional view are reversed to FIGS. 4A and 4B in order to correspond to the coordinate axes of the exit pupil plane. In FIG. 5, a first pupil partial area 1401 which corresponds to the first focus detecting pixel 1201 has a substantially conjugate relationship with the light-receiving surface of the photoelectric conversion unit 1301 whose center of gravity is eccentric in the −x direction due to the microlens 1303, and represents a pupil area where the first focus detecting pixel 1201 can receive light. The first pupil partial area 1401 which corresponds to the first focus detecting pixel 1201 has a center of gravity eccentric to the +X side on the pupil plane. In FIG. 5, a second pupil partial area 1402 which corresponds to the second focus detecting pixel 1202 has a substantially conjugate relationship with the light-receiving surface of the photoelectric conversion unit 1302 whose center of gravity is eccentric in the +x direction due to the microlens 1303, and represents a pupil area where the second focus detecting pixel 1202 can receive light. The second pupil partial area 1402 which corresponds to the second focus detecting pixel 1202 has a center of gravity eccentric to the −X side on the pupil plane. An exit pupil 1500 is formed by the diaphragm mechanism 11 of the lens apparatus 2, and a light beam inside this area reaches the image sensor 1106. In FIG. 5, a pupil area 1400 is a pupil area where light can be received by the entire pixel 1200G in a case where the photoelectric conversion unit 1301 and the photoelectric conversion unit 1302 (first focus detecting pixel 1201 and second focus detecting pixel 1202) are all combined.

Figure 6:
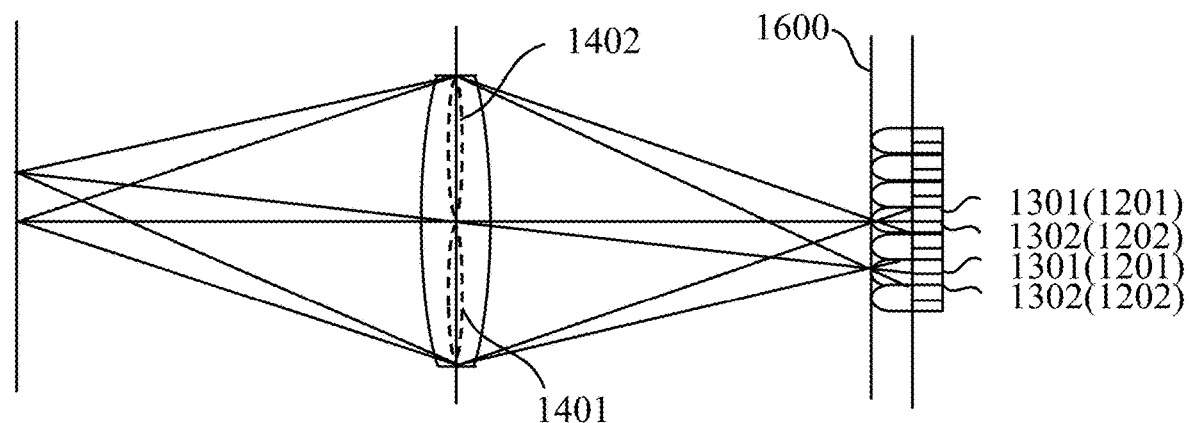
FIG. 6 illustrates a relationship between the image sensor and the pupil division according to this embodiment.

FIG. 6 illustrates a relationship between the image sensor 1106 and the pupil division. The light beams that have passed through different pupil partial areas of the first pupil partial area 1401 and the second pupil partial area 1402, enter each pixel of the image sensor 1106 at different angles, and are received by the first focus detecting pixel 1201 and the second focus detecting pixel 1202 which are divided into 2×1. This embodiment is an example in which the pupil area is divided into two pupils in the horizontal direction. If necessary, the pupil division may be performed in the vertical direction. In this embodiment, a first focus detecting signal is generated by collecting light-receiving signals of the first focus detecting pixel 1201 of each pixel of the image sensor 1106, and a second focus detecting signal is generated by collecting light-receiving signals of the second focus detecting pixel 1202 of each pixel of the image sensor 1106, thereby the focus detection is performed. Adding the signals of the first focus detecting pixel 1201 and the second focus detecting pixel 1202 for each pixel of the image sensor 1106 can generate an imaging signal with a resolution of N effective pixels.

Figure 7:
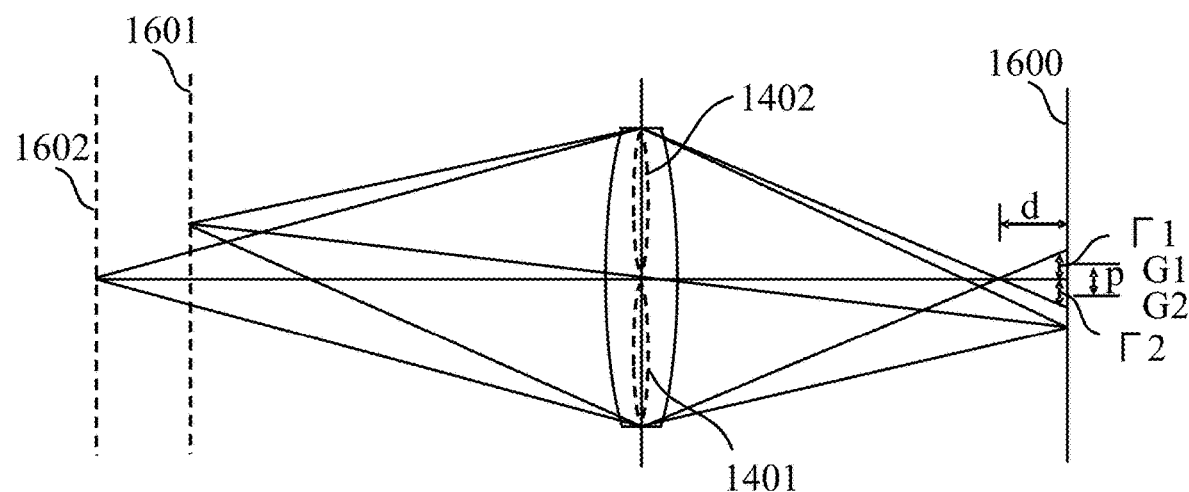
FIG. 7 illustrates a relationship between a defocus amount and an image shift amount of a first focus detecting signal and a second focus detecting signal according to this embodiment.

Referring now to FIG. 7, a description will be given of a relationship between a defocus amount and an image shift amount between the first focus detecting pixel 1201 and the second focus detecting pixel 1202 acquired from the image sensor 1106. FIG. 7 illustrates the relationship between the defocus amount and the image shift amount between the first focus detecting signal and the second focus detecting signal. The image sensor 1106 is disposed on an imaging surface 1600, and the exit pupil of the lens apparatus 2 is divided into two of the first pupil partial area 1401 and the second pupil partial area 1402, similarly to FIGS. 5 and 6.

A magnitude |d| of the defocus amount d is defined as a distance from an imaging position of an object to the imaging surface. A front focus state where the imaging position of the object is located on the object side of the imaging surface is expressed by a negative sign (d<0), and a rear focus state where the imaging position of the object is located on an opposite side of the object of the imaging surface is expressed by a positive sign (d>0). An in-focus state in which the imaging position of the object is located on the imaging surface (in-focus position) is expressed by d=0. In FIG. 7, an object 1601 illustrates an example of the in-focus state (d=0), and an object 1602 illustrates an example of the front focus state (d<0). The front focus state (d<0) and the rear focus state (d>0) are a defocus state (|d|>0).

In the front focus state (d<0), among light beams from the object 1602, the light beam that has passed through the first pupil partial area 1401 is once condensed, then spreads out with a width Γ1 around a center of gravity position G1 of the light beam, and becomes a blurred image on the imaging surface 1600. The blurred image is received by the first focus detecting pixel 1201 which constitutes each pixel arranged on the image sensor 1106, and the first focus detecting signal is generated. Therefore, the first focus detecting signal is recorded as an image of the object 1602 with the width Γ1 blurred at the center of gravity position G1 on the imaging surface 1600.

Similarly, among light beams from the object 1602, the light beam that has passed through the second pupil partial area 1402 is once condensed, then spreads out with a width Γ2 around a center of gravity position G2 of the light beam, and becomes a blurred image on the imaging surface 1600. The blurred image is received by the second focus detecting pixel 1202 which constitutes each pixel arranged on the image sensor 1106, and the second focus detecting signal is generated. Therefore, the second focus detecting signal is recorded as an image of the object 1602 with the width Γ2 blurred at the center of gravity position G2 on the imaging surface 1600.

The blur widths Γ1 and Γ2 of the object image increase approximately proportionally as the magnitude |d| of the defocus amount d increases. Similarly, a magnitude |p| of the image shift amount p of the object image between the first focus detecting signal and the second focus detecting signal (=difference G1−G2 in the center of gravity position of the light beam) also increases approximately proportionally as the magnitude |d| of the defocus amount d increases. The same is true in the rear focus state (d>0), although the image shift direction of the object image between the first focus detecting signal and the second focus detecting signal is opposite to that in the front focus state.

Therefore, as the first focus detecting signal and the second focus detecting signal increase, or the magnitude of the defocus amount of the imaging signal that is the sum of the first focus detecting signal and the second focus detecting signal increases, the magnitude of the image shift amount between the first focus detecting signal and the second focus detecting signal increases.

In the focus detection using an imaging-surface phase-difference method according to this embodiment, the first focus detecting signal and the second focus detecting signal are shifted relative to each other to calculate a correlation amount which represents the degree of coincidence of the signals, and the image shift amount is detected from a shift amount which improves the correlation. Based on a relationship in which the magnitude of the image shift amount between the first focus detecting signal and the second focus detecting signal increases as the magnitude of the defocus amount of the imaging signal increases, the focus detection is performed by converting the image shift amount into a detected defocus amount.

Tilt Effect

Figure 8A:
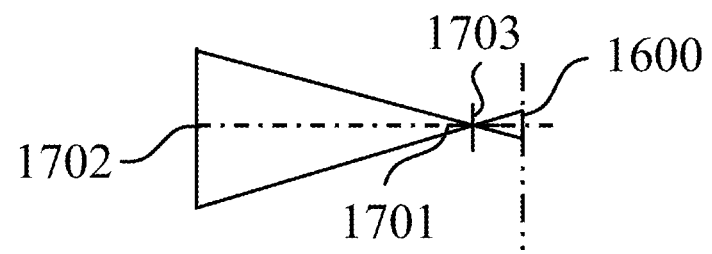
FIGS. 8A and 8B explain the Scheimpflug principle according to this embodiment.

Referring now to FIGS. 8A to 9B, a description will be given of the Scheimpflug principle. FIGS. 8A and 8B explain of the Scheimpflug principle. FIG. 8A illustrates an in-focus range in a case where an optical axis of an optical system 1701 is not tilted relative to a direction perpendicular to the imaging surface 1600. FIG. 8B illustrates an in-focus range in a case where the optical axis of the optical system 1701 is tilted relative to a direction perpendicular to the imaging surface 1600.

Figure 8B:
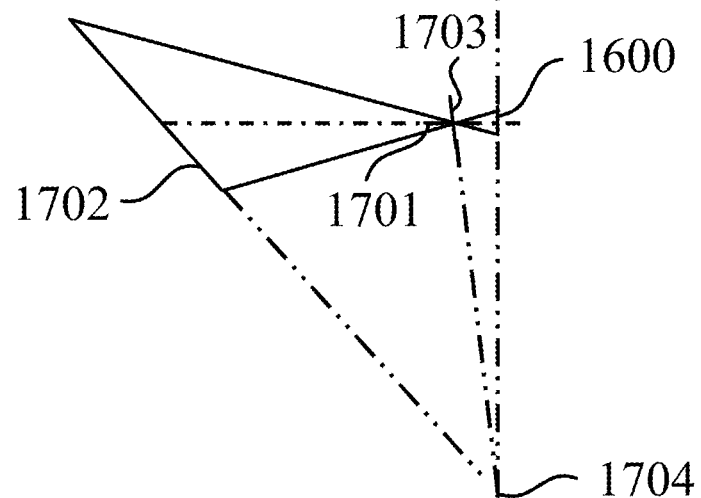

The Scheimpflug principle is that, as illustrated in FIG. 8B, in a case where the imaging surface 1600 and a principal surface 1703 of the optical system 1701 intersect at an intersection 1704, an in-focus object plane 1702 also passes through the intersection 1704. Therefore, in a case where the optical axis of the optical system 1701 is tilted relative to the imaging surface 1600, the in-focus range on the object side is determined by the Scheimpflug principle. In a case where the object to be captured has a depth, by tilting the object plane 1702 along the depth, the object can be focused on from the front to the back of the object. On the other hand, tilting the principal surface 1703 of the optical system 1701 in a direction opposite to the tilt of the object with the depth can make the object plane 1702 intersect with the depth direction of the object at an angle close to a right angle. In this case, since the in-focus range can be extremely narrowed, a diorama-like image can be obtained.

Figure 9A:
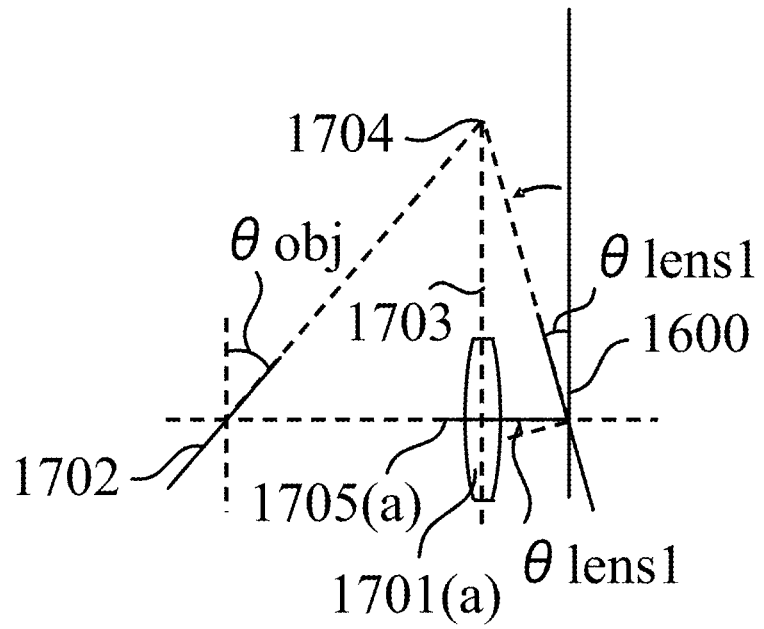
FIGS. 9A and 9B explain optical systems during tilt imaging according to this embodiment.

In the lens apparatus disclosed in Japanese Patent Laid-Open No. 2010-191078, as illustrated in FIG. 9A, tilting the optical system 1701 (a) by θlens1 (tilting the imaging surface 1600 by θlens1) generates tilt θobj of the object plane 1702. At this time, an angle of ray 1705 (a) incident on the imaging surface 1600 changes by θlens1 in comparison with a case where the optical system 1701 (a) is not tilted.

Figure 9B:
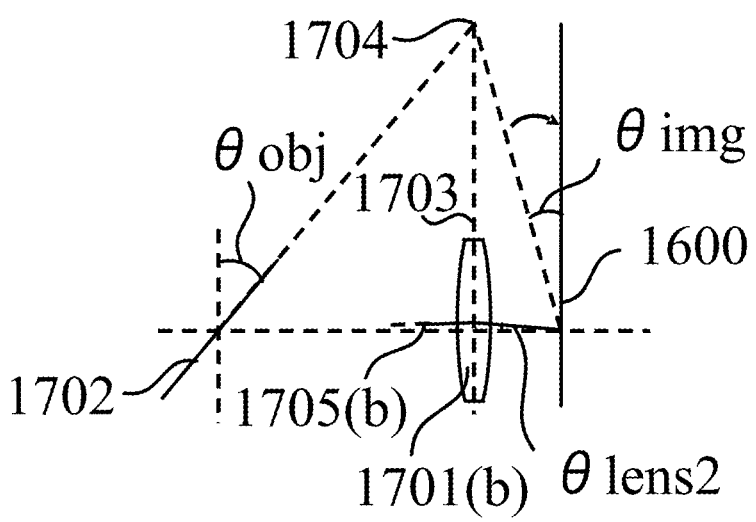

On the other hand, in this embodiment, as illustrated in FIG. 9B, utilizing an image plane tilt due to an eccentricity of the optical system 1701 (b) generates tilt θobj of the object plane 1702 without tilting the imaging surface 1600 by the image plane tilt θimg. However, if the tilt θobj of the object plane 1702 is generated only by the optical system 1701 (b), the eccentricity amount of the optical system 1701 (b) increases, and the composition shift (field of view shift) increases. Accordingly, a lens designed to reduce aberration fluctuations during eccentricity may be decentered. In order to change the tilt effect, this embodiment decenters the sixth lens unit 26 configured to tilt the object plane, and the eighth lens unit 28 configured to correct aberration fluctuations during eccentricity. At this time, the angle of the ray 1705 (b) incident on the imaging surface 1600 changes by θlens2, but θlens2 is much smaller than θlens1.

Focus Detection During Tilt (First Control Mode)

Figure 10A:
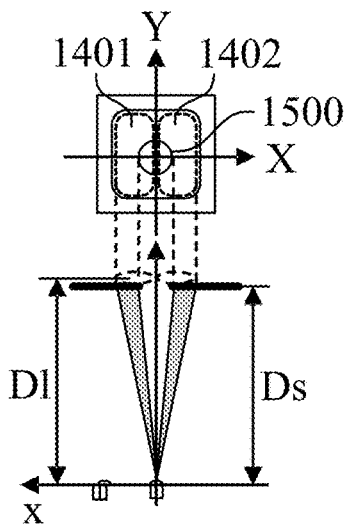
FIGS. 10A to 10F illustrate a relationship between the tilt imaging and focus detection according to this embodiment.
Figure 10B:
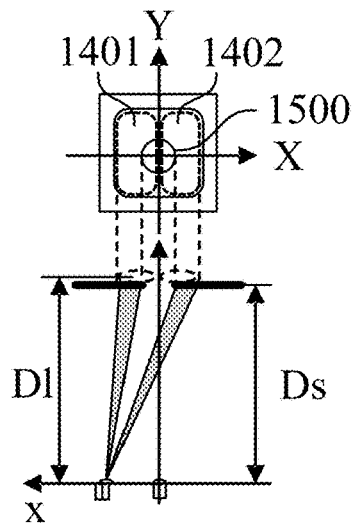
Figure 10C:
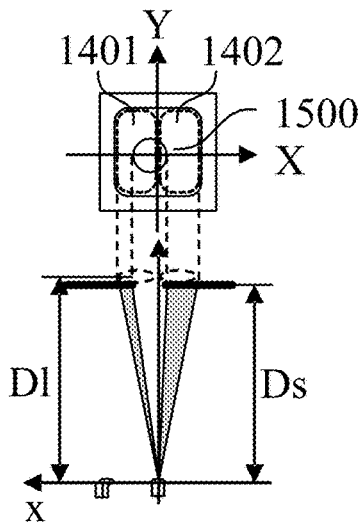
Figure 10D:
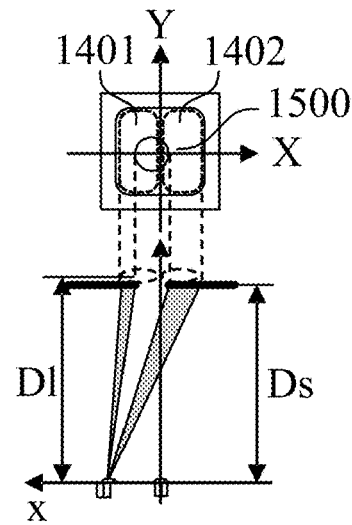
Figure 10E:
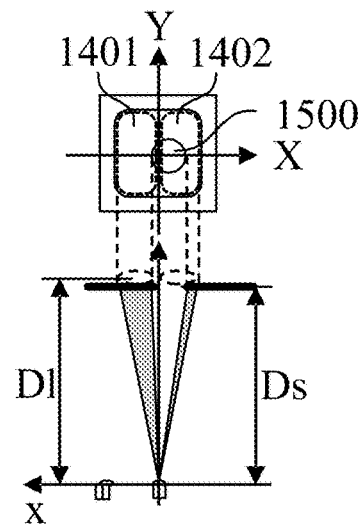
Figure 10F:
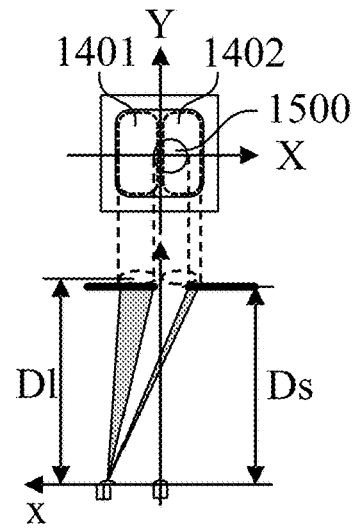

FIGS. 10A to 10F illustrate a relationship between tilt imaging and focus detection, and illustrate pupil division on an exit pupil plane observed by the pixel unit in the focus detecting area in a case where the optical system 1701 (a) illustrated in FIG. 9A is used. FIGS. 10A, 10C, and 10E illustrate pupil division on the exit pupil plane observed by the pixel unit in the focus detecting area at a central image height, and FIGS. 10B, 10D, and 10F illustrate pupil division on the exit pupil plane observed by the pixel unit in the focus detecting area at a peripheral image height (+X direction). FIGS. 10A to 10F assumes a system in which exit pupil distance Dl of the optical system 1701 (a) and set pupil distance Ds of the image sensor 1106 are approximately equivalent.

Referring to FIGS. 10A and 10B, a description will be given of pupil division in a case where the optical system 1701 (a) is not decentered. A circular shape illustrated at the center of the pupil plane at the top of FIG. 10A illustrates the exit pupil 1500 formed by the aperture in the diaphragm of the optical system 1701 (a). It is understood that at the central image height, the light beam on the exit pupil plane of the optical system 1701 (a), which is approximately equidistant from the set pupil distance of the image sensor 1106, is divided into left and right parts approximately equally. On the other hand, also at the peripheral image height in FIG. 10B, the set pupil distance Ds of the image sensor 1106 is almost equivalent to the exit pupil distance Dl of the optical system 1701 (a), and the light beam on the exit pupil plane of the optical system 1701 (*a*) can be divided approximately equally into left and right parts.

FIGS. 10C to 10F are schematic diagrams illustrating pupil division on the exit pupil plane when the optical system 1701 (*a*) is tilted by +θlens1. As described above, this embodiment arranges the first focus detecting pixel 1201 and the second focus detecting pixel 1202 of the image sensor 1106 side by side in the X-axis direction. Thus, in a case where the optical system 1701 (*a*) is tilted around the Y-axis direction, the degree of influence on the pupil division for the focus detection increases.

FIGS. 10C and 10D illustrate the optical system 1701 (*a*) decentered by +θlens1, and FIGS. 10E and 10F illustrate the optical system 1701 (*a*) decentered by −θlens1. In FIGS. 10C and 10D, the exit pupil 1500 moves in the +X direction, and the pupil divisions at the central image height and peripheral image height become unequal on the left and right sides. In FIGS. 10E and 10F, the exit pupil 1500 moves in the −X direction, and the pupil divisions at the central image height and peripheral image height become unequal on the left and right sides. That is, in a case where the optical system 1701 (*a*) is decentered to produce the tilt effect, the first focus detecting signal and the second focus detecting signal do not match even though the object is in focus. Thus, the focus detection cannot be accurately performed and the in-focus state cannot be achieved.

Figure 11A:
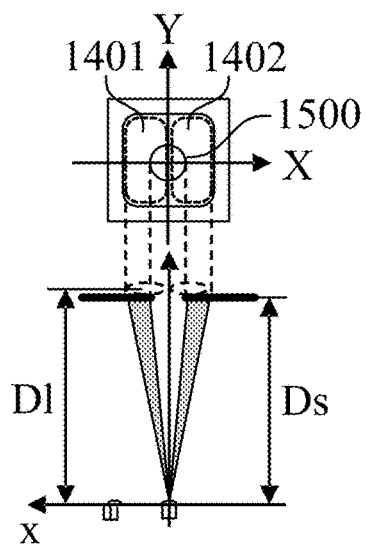
FIGS. 11A to 11F illustrate a relationship between the tilt imaging and focus detection according to this embodiment.
Figure 11B:
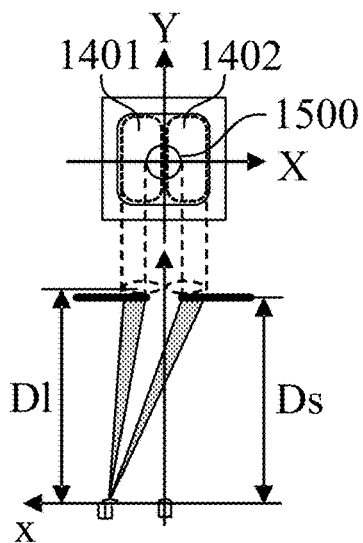
Figure 11C:
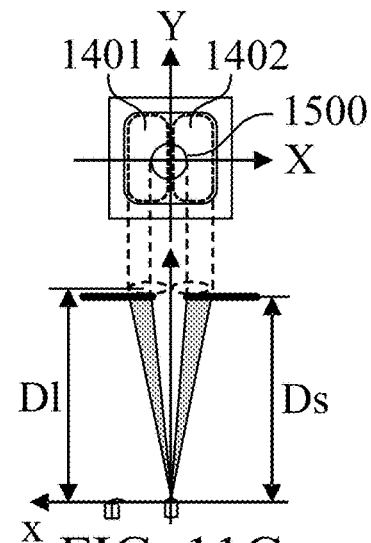
Figure 11D:
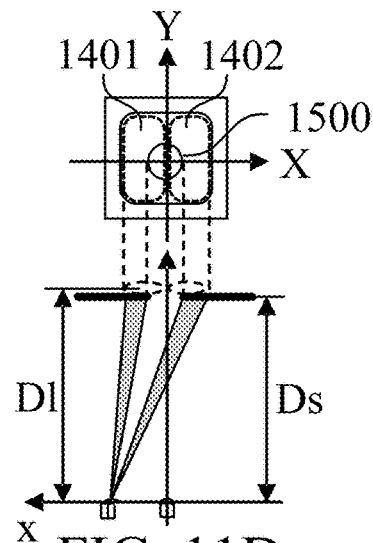
Figure 11E:
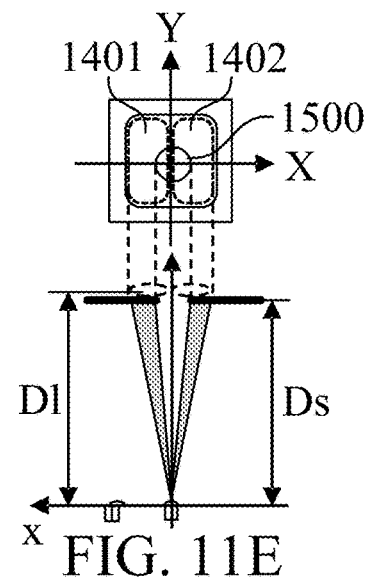
Figure 11F:
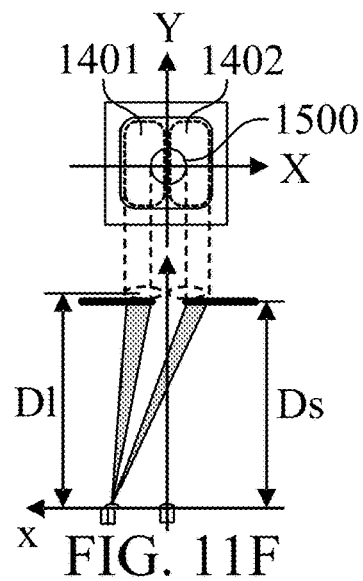

FIGS. 11A to 11F illustrate a relationship between tilt imaging and focus detection, and illustrate pupil division on an exit pupil plane observed by a pixel unit in a focus detecting area in a case where the optical system 1701 (*b*) illustrated in FIG. 9B is used. FIGS. 11A, 11C, and 11E illustrate pupil division on the exit pupil plane observed by the pixel unit in the focus detecting area at a central image height, and FIGS. 11B, 11D, and 11F illustrate pupil division on the exit pupil plane observed by the pixel unit in the focus detecting area at a peripheral image height (+X direction). FIGS. 11A to 11F assumes a system which the exit pupil distance DI of the optical system 1701 (*b*) and the set pupil distance Ds of the image sensor 1106 are approximately equivalent.

Referring to FIGS. 11A and 11B, a description will be given of pupil division in a case where the optical system 1701 (*b*) is not decentered. A circular shape illustrated at the center of the pupil plane in the upper part of FIG. 11A illustrates the exit pupil 1500 formed by the aperture in the diaphragm of the optical system 1701 (*b*). It is understood that at the central image height, the light beam on the exit pupil plane of the optical system 1701 (*b*), which is approximately equidistant from the set pupil distance of the image sensor 1106, is divided into left and right parts approximately equally. On the other hand, also at the peripheral image height in FIG. 11B, the set pupil distance Ds of the image sensor 1106 is almost equivalent to the exit pupil distance DI of the optical system 1701 (*b*), and the light beam on the exit pupil plane of the optical system 1701 (*b*) can be divided approximately equally into left and right parts.

FIGS. 11C to 11F illustrate pupil division on the exit pupil plane in a case where the tilt lens (sixth lens unit 26) and the correction lens (eighth lens unit 28) of the optical system 1701 (*b*) are decentered and the object plane 1702 is tilted by ±θobj. As described above, this embodiment arranges the first focus detecting pixel 1201 and the second focus detecting pixel 1202 of the image sensor 1106 side by side in the X-axis direction. Thus, in a case where the tilt lens and the correction lens move in the X-axis direction, the degree of influence on the pupil division for the focus detection increases.

FIGS. 11C and 11D illustrate a case where the object plane 1702 is decentered by +θobj, and FIGS. 11E and 11F illustrate a case where the object plane 1702 is decentered by −θobj. In FIGS. 11C and 11D, the exit pupil 1500 moves in the +X direction, and in FIGS. 11E and 11F, the exit pupil 1500 moves in the −X direction. Since the change amount θlens2 in the incident ray angle on the image sensor 1106 is minute, the moving amount of the exit pupil 1500 is smaller than that of FIGS. 10A to 10F. The focus detecting system in the camera body 3 is compatible with various incident ray angles for each interchangeable lens, and thus has a considerable degree of robustness against ray angle changes. Therefore, the optical system 1701 (*b*) (lens apparatus 2) according to this embodiment can perform focus detection even during the tilt imaging. That is, as long as the lens apparatus 2 is controlled in the first control mode for moving the correction lens so as to correct the composition shift caused by the movement of the tilt lens, the image sensor 1106 can provide focus detection.

Second Control Mode

Figure 12A:
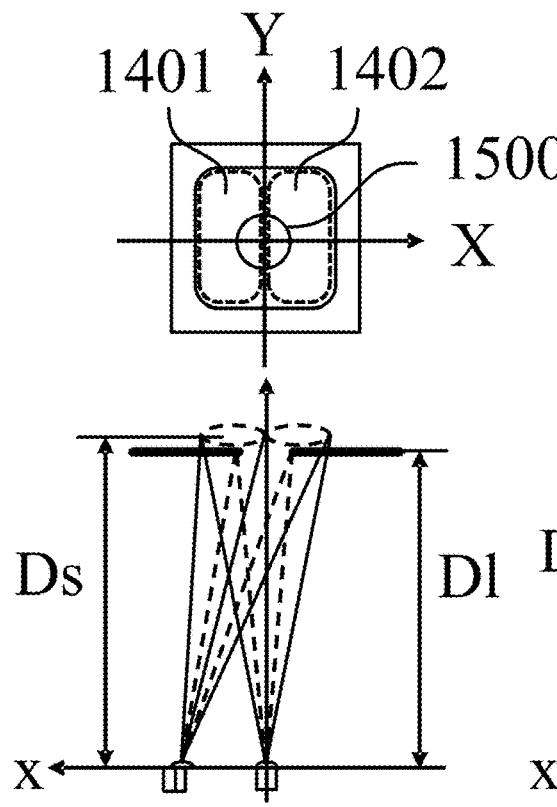
FIG. 12A to 12C explain intensity unevenness due to a pupil shift between the first focus detecting signal and the second focus detecting signal according to this embodiment.
Figure 12B:
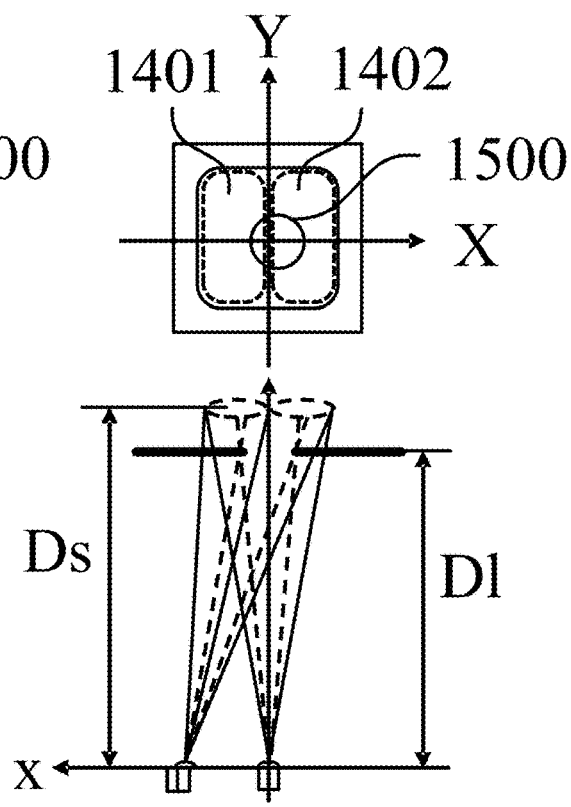
Figure 12C:
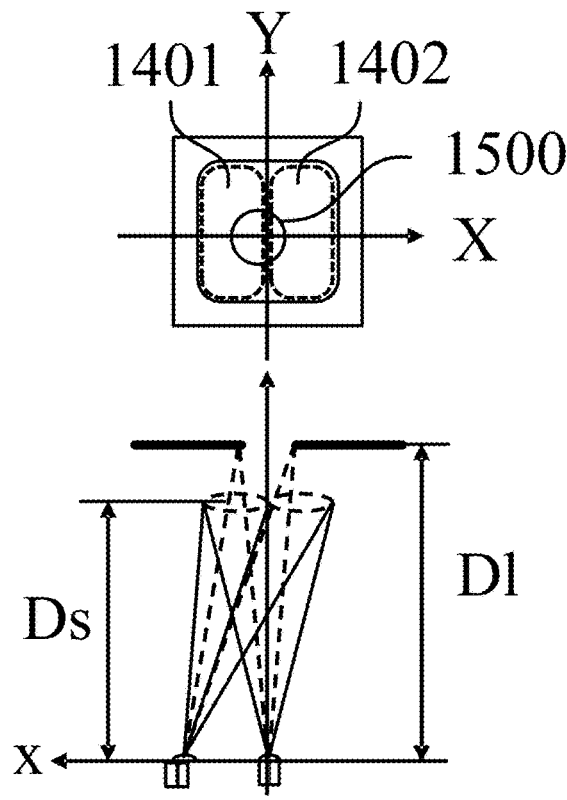

Referring now to FIGS. 12A to 12C, a description will be given of a case in which accurate focus detection cannot be performed in the lens apparatus 2 according to this embodiment. FIG. 12A to 12C explain intensity unevenness due to a pupil shift between the first focus detecting signal and the second focus detecting signal, that is, explain an effective aperture value (effective F-number) due to the pupil shift. FIGS. 12A and 12B illustrate a relationship between the first pupil partial area 1401 and the second pupil partial area 1402 corresponding to the first focus detecting pixel 1201 and the second focus detecting pixel 1202 of each pixel arranged at the peripheral image height of the image sensor 1106, respectively, and the exit pupil 1500 of the imaging optical system.

FIG. 12A illustrates a case where the exit pupil distance DI of the lens apparatus 2 and the set pupil distance Ds of the image sensor 1106 are the same. In this case, the exit pupil 1500 of the lens apparatus 2 is divided into approximately equal parts by the first pupil partial area 1401 and the second pupil partial area 1402. On the other hand, as illustrated in FIG. 12B, in a case where the exit pupil distance Dl of the lens apparatus 2 is shorter than the set pupil distance Ds of the image sensor 1106, at the peripheral image height of the image sensor 1106, a misalignment occurs between the exit pupil 1500 and the entrance pupil of the image sensor 1106, and the exit pupil 1500 is divided unevenly.

Similarly, as illustrated in FIG. 12C, in a case where the exit pupil distance DI of the lens apparatus 2 is longer than the set pupil distance Ds of the image sensor 1106, at the peripheral image height of the image sensor 1106, a shift occurs between the exit pupil 1500 and the entrance pupil of the image sensor 1106, and the exit pupil 1500 is divided unevenly. As the pupil division becomes uneven at the peripheral image height, the intensities of the first focus detecting signal and the second focus detecting signal also become uneven. The intensity unevenness may occur in which the intensity of one of the first focus detecting signal and the second focus detecting signal increases while the intensity of the other decreases. Thereby, focus detecting accuracy may lower.

As the diaphragm mechanism 11 is driven to increase the F-number (=reduce the aperture diameter), the diameter of the exit pupil 1500 reduces. Therefore, in a case where the exit pupil 1500 is divided non-uniformly, the non-uniformity degree expands and the focus detecting accuracy further deteriorates. That is, depending on the image height (focus area) where the focus detection is performed and the F-number during the focus detection, the focus detecting accuracy may deteriorate in the tilt imaging in the first control mode. Accordingly, in a case where the focus detection is difficult in the first control mode, the tilt imaging is performed in a second control mode, which will be described next.

Figure 13A:
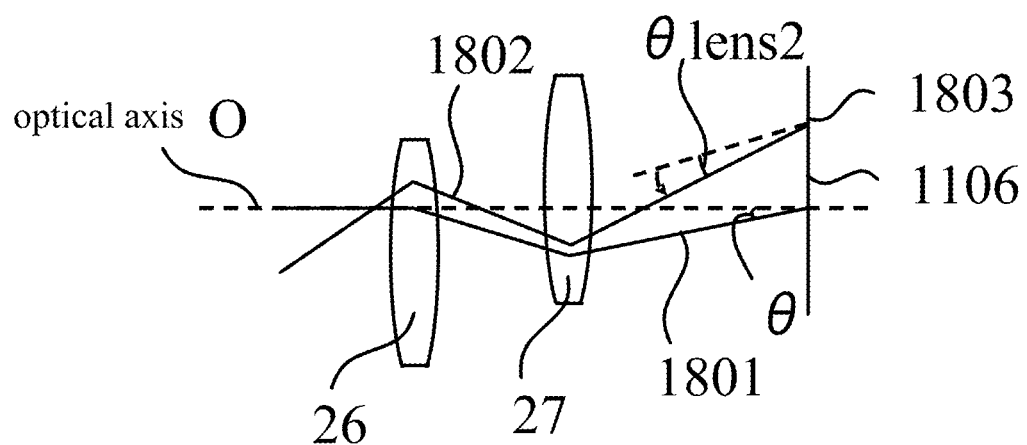
FIGS. 13A and 13B explain a control mode that enables focus detection during the tilt imaging according to this embodiment.
Figure 13B:
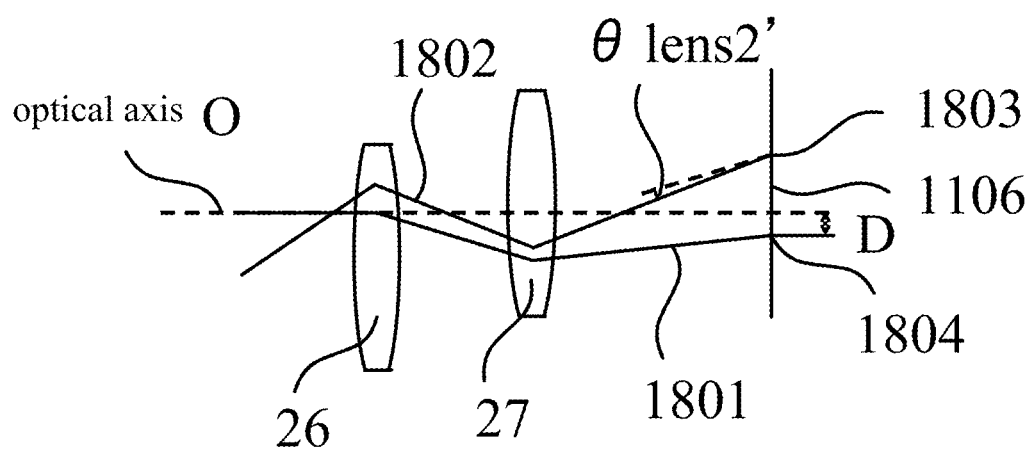

Referring now to FIGS. 13A and 13B, a description will be given of a control mode that enables focus detection during the tilt imaging. FIGS. 13A and 13B explain the control mode that enables focus detection during the tilt imaging, and illustrate how the focus detection is performed at point 1803 where ray 1802 that enters the lens apparatus 2 enters the image sensor 1106.

FIG. 13A illustrates a case where the focus detection cannot be satisfactorily performed in the first control mode due to the influence of the image height and F-number described above. At this time, a ray 1801 which passes through the optical axis O of the lens apparatus 2 and is incident parallel to the optical axis O enters a point where the optical axis O and the image sensor 1106 intersect at an incident ray angle θ. Here, the incident ray angle θ is an angle between the ray which enters the imaging surface of the image sensor 1106 and the normal line of the imaging surface. The ray 1802 then enters the image sensor 1106 at an angle which is changed by θlens2 from the incident angle in a case where the tilt lens or the correction lens are not moving. At this time, the exit pupil 1500 is divided non-uniformly, and thereby the focus detecting accuracy deteriorates.

FIG. 13B illustrates a state in which the focus detection is performed in the second control mode, in which the eighth lens unit 28 is controlled so that a ray 1802 enters the image sensor 1106 with an angle change amount θlens2' that allows focus detection. At this time, an incident position of the ray 1801 deviates from the point where the optical axis O and the image sensor 1106 intersect, and enters a point 1804. That is, shifting the composition by the distance D enables focus detection at the position where the ray 1802 is incident. The second control mode allows focus detection with a desired tilt effect even under conditions such as an image height and F-number adverse to the focus detection.

The camera system 1 according to this embodiment has a determination value according to information (first information) on a moving amount of the tilt lens (tilt amount) and information on an F-number (second information). The camera system 1 stores a predetermined threshold in a memory 1004, for example. In a case where the camera CPU 15 determines that the determination value is smaller than the predetermined threshold during imaging, the camera CPU 15 sets the control mode to the first control mode. On the other hand, in a case where the camera CPU 15 determines that the determination value is larger than the predetermined threshold during imaging, the camera CPU 15 sets the control mode to the second control mode. Here, the predetermined threshold is set based on whether focus detection with sufficient accuracy is possible or not in a case of performing the phase difference focus detection in the first control mode under the condition of the tilt amount and F-number corresponding to the determination value. Information on a predetermined area (focus area) of the image sensor 1106 may be added as information for setting the determination value. That is, the determination value may be determined using the information on the predetermined area of the image sensor 1106. Here, the information on the predetermined area may include information on the image height or an area specified by the user.

As the predetermined threshold, a numerical table according to the determination value may be stored in the memory 1004, or a function for calculating the predetermined threshold using the determination value may be stored in the memory 1004.

The camera system 1 may drive the diaphragm mechanism 11 to reduce the F-number (increase the aperture diameter in the diaphragm) during focus detection. Thereby, the intensity unevenness of the first focus detecting signal and the second focus detecting signal can be reduced. At this time, the control unit 15b may control the diaphragm mechanism 11 so that the control mode is set to the first control mode. Alternatively, the control unit 15b may change the aperture diameter in the diaphragm mechanism 11 in a case where the control mode is the second control mode, and determine whether or not focus detection using the phase difference method can be performed based on the second information on the changed aperture diameter.

A first imaging mode may be provided that moves the sixth lens unit 26 within a range in which the determination value does not exceed the predetermined threshold. That is, the control unit 15b may fix the control mode to the first control mode based on the user's instruction. The first imaging mode allows the user to perform the focus detection without shifting the composition.

The camera system 1 may also include a second imaging mode that automatically switches between the first control mode and the second control mode based on the determination value and the predetermined threshold. Thereby, the user can always use the focus detection using the phase difference method even during the tilt imaging.

The camera system 1 may display an area that can provide focus detection or an area (focus area) that cannot provide focus detection in the first control mode in a distinguishable form on the display unit 1108. In other words, the control unit 15b may set an area in the image sensor 1106, which can provide the focus detection using the phase difference method, according to the first information and the second information and present it to the user (through highlighted display or the like). This allows the user to recognize the focus area where the composition shift occurs due to the second control mode.

In a case where focus detection cannot be performed in either the first control mode or the second control mode, the camera system 1 may perform focus detection using a contrast method that provides focus detection by comparing a contrast amount of a captured image output by the image sensor 1106. That is, the control unit 15b may perform the focus detection using the contrast method outside the area that can provide focus detection (area that cannot provide focus detection).

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide a control apparatus that can perform accurate focus detection during tilt imaging.

This application claims priority to Japanese Patent Application No. 2023-081717, which was filed on May 17, 2023, and which is hereby incorporated by reference herein in its entirety.

What is claimed is:

1. A control apparatus comprising:
a memory storing instructions; and
a processor configured to execute the instructions to:
acquire first information on a position of a first optical member configured to obtain a tilt effect of tilting a focal plane relative to an imaging surface of an image sensor, and second information on an aperture diameter in a diaphragm unit configured to adjust a light amount, and
control a second optical member configured to change an incident ray angle on the image sensor, by changing a control mode of the second optical member according to the first information and the second information.

2. The control apparatus according to claim 1, wherein the processor is configured to:
determine whether or not focus detection using a phase difference method can be performed based on the first information and the second information, and
change, in a case where the processor determines that the focus detection using the phase difference method cannot be performed, the incident ray angle so that the focus detection using the phase difference method can be performed.

3. The control apparatus according to claim 2, wherein the processor is configured to:
set the control mode to a first mode in a case where the processor determines that the focus detection using the phase difference method can be performed,
set the control mode to a second mode in a case where the processor determines that the focus detection using the phase difference method cannot be performed,
control, in the first mode, the second optical member so as to maintain a field of view in accordance with a tilt amount according to the position of the first optical member, and
control, in the second mode, the second optical member so that the incident ray angle becomes an angle that enables the focus detection using the phase difference method to be performed.

4. The control apparatus according to claim 3, wherein the processor is configured to:
control, in the first mode, the second optical member so that a ray that is incident through an optical axis of an optical system passes through a point where the optical axis intersects the image sensor, and
control, in the second mode, the second optical member so that an angle between a ray incident on the image sensor and the image sensor becomes an angle that allows the focus detection using the phase difference method.

5. The control apparatus according to claim 3, wherein the processor is configured to control the diaphragm unit so that the control mode is set to the first mode.

6. The control apparatus according to claim 3, wherein the processor is configured to:
change the aperture diameter in the diaphragm unit in a case where the control mode is the second mode, and
determine whether or not the focus detection using the phase difference method can be performed based on the second information on a changed aperture diameter.

7. The control apparatus according to claim 3, wherein the processor can fix the control mode to the first mode based on an instruction of a user.

8. The control apparatus according to claim 1, wherein the processor is configured to:
determine whether or not a determination value according to the first information and the second information is larger than a predetermined threshold,
set the control mode to a first mode in a case where the determination value is smaller than the predetermined threshold,
set the control mode to a second mode in a case where the determination value is larger than the predetermined threshold,
control, in the first mode, the second optical member so as to maintain a field of view in accordance with a tilt amount according to the position of the first optical member, and
control, in the second mode, the second optical member so that the incident ray angle becomes an angle that enables focus detection using a phase difference method to be performed.

9. The control apparatus according to claim 8, wherein in a case where the processor controls an optical system so that a ray which passes through an optical axis of the optical system and is incident parallel to the optical axis passes through a point where the optical axis and the image sensor intersect by the first optical member and the second optical member, the processor, the processor is configured to:
perform the focus detection using the phase difference method in a predetermined area on the image sensor in a case where the determination value is smaller than the predetermined threshold, and
not perform the focus detection using the phase difference method in the predetermined area on the image sensor in a case where the determination value is larger than the predetermined threshold.

10. The control apparatus according to claim 9, wherein the determination value is determined using information on the predetermined area on the image sensor.

11. The control apparatus according to claim 10, wherein the information on the predetermined area is information on an image height or an area specified by a user.

12. The control apparatus according to claim 1, wherein the processor is configured to set an area on the image sensor that can provide focus detection using a phase difference method according to the first information and the second information and present the area to a user.

13. The control apparatus according to claim 12, wherein the processor is configured to perform focus detection using a contrast method outside the area.

14. The control apparatus according to claim 1, wherein each of the first optical member, the second optical member, and the diaphragm unit constitutes a part of an optical system, and wherein the position of the first optical member is an eccentricity amount from an optical axis of the optical system in a direction orthogonal to the optical axis.

15. The control apparatus according to claim 1, wherein the incident ray angle is an angle between a ray incident on the imaging surface of the image sensor and a normal line to the imaging surface.

16. An image pickup apparatus comprising:
an image sensor; and
the control apparatus according to claim 1.

17. A lens apparatus attachable to and detachable from an image pickup apparatus, the lens apparatus comprising:

a first optical member configured to obtain a tilt effect of tilting a focal plane relative to an imaging surface of an image sensor;
a second optical member configured to change an incident ray angle on the image sensor;
a diaphragm unit configured to adjust a light amount; and
a processor configured to change a control mode of the second optical member according to first information on a position of the first optical member and second information on an aperture diameter in the diaphragm unit.

18. A control method comprising:
an acquisition step of acquiring first information on a position of a first optical member configured to obtain a tilt effect of tilting a focal plane relative to an imaging surface of an image sensor, and second information on an aperture diameter of a diaphragm unit configured to adjust a light amount, and
a control step of controlling a second optical member configured to change an incident ray angle to the image sensor, by changing a control mode of the second optical member according to the first information and the second information.

19. A non-transitory computer-readable storage medium storing a computer program that causes a computer to execute the control method according to claim 18.

* * * * *